(12) United States Patent
Yoon et al.

(10) Patent No.: US 11,625,196 B2
(45) Date of Patent: Apr. 11, 2023

(54) SEMICONDUCTOR MEMORY DEVICE AND OPERATING METHOD THEREOF

(71) Applicant: SK hynix Inc., Gyeonggi-do (KR)

(72) Inventors: Young-Jun Yoon, Gyeonggi-do (KR); Hyun-Seung Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/406,709

(22) Filed: Aug. 19, 2021

(65) Prior Publication Data

US 2021/0382659 A1 Dec. 9, 2021

Related U.S. Application Data

(62) Division of application No. 16/253,023, filed on Jan. 21, 2019, now Pat. No. 11,137,939.

(30) Foreign Application Priority Data

Apr. 6, 2018 (KR) .......................... 10-2018-0040203

(51) Int. Cl.
*G06F 3/06* (2006.01)

(52) U.S. Cl.
CPC ............ *G06F 3/0659* (2013.01); *G06F 3/061* (2013.01); *G06F 3/064* (2013.01); *G06F 3/0673* (2013.01)

(58) Field of Classification Search
CPC .......... G06F 3/06; G06F 3/0659; G06F 3/061; G06F 3/064; G06F 12/00; G06F 13/00; G06F 3/0673
See application file for complete search history.

(56) References Cited

U.S. PATENT DOCUMENTS

| 7,191,295 B2 * | 3/2007 | Qawami ............. G06F 13/4243 365/230.01 |
| 9,245,639 B1 * | 1/2016 | Lee ......................... G11C 7/18 |
| 2004/0034749 A1 * | 2/2004 | Jeddeloh ............. G11C 11/4074 711/154 |
| 2016/0378366 A1 | 12/2016 | Tomishima et al. |

FOREIGN PATENT DOCUMENTS

JP  2013-182635 A  9/2013

OTHER PUBLICATIONS

Office Action for the Korean Patent Application No. 10-2018-0040203 issued by the Korean Patent Office dated Nov. 21, 2022.

* cited by examiner

*Primary Examiner* — Tuan V Thai
(74) *Attorney, Agent, or Firm* — IP & T Group LLP (57) ABSTRACT

A semiconductor memory device includes a memory region including a plurality of memory blocks, and suitable for outputting first and second read data from first and second memory blocks among the plurality of memory blocks based on first and second read control signals and a read address signal; a scheduler suitable for outputting a read scheduling signal based on the first and second read control signals; and an output driver suitable for outputting the first and second read data by a predetermined burst length alternately twice or more to a data pad based on a mode signal, wherein the first read data are outputted to the data pad according to a first burst sequence, and the second read data are outputted to the data pad according to a second burst sequence, based on the read scheduling signal.

4 Claims, 7 Drawing Sheets

| Burst Length | ICA<K> | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|
| | | | | | | | | | | | | | | | Burst Cycle Number and Burst Address Sequence | | | | | | | | | | | | | | | | | | |
| 32 | 0 | 0 | 1 | 2 | 3 | 4 | 5 | 6 | 7 | 8 | 9 | A | B | C | D | E | F | 10 | 11 | 12 | 13 | 14 | 15 | 16 | 17 | 18 | 19 | 1A | 1B | 1C | 1D | 1E | 1F |
| | 1 | 8 | 9 | A | B | C | D | E | F | 0 | 1 | 2 | 3 | 4 | 5 | 6 | 7 | 18 | 19 | 1A | 1B | 1C | 1D | 1E | 1F | 10 | 11 | 12 | 13 | 14 | 15 | 16 | 17 |

FIG. 8

| Burst Length | ICA <K> | Burst Cycle Number and Burst Address Sequence | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| 32 | 0 | 0 | 1 | 2 | 3 | 4 | 5 | 6 | 7 | 8 | 9 | A | B | C | D | E | F | 10 | 11 | 12 | 13 | 14 | 15 | 16 | 17 | 18 | 19 | 1A | 1B | 1C | 1D | 1E | 1F |
| | 1 | 10 | 11 | 12 | 13 | 14 | 15 | 16 | 17 | 18 | 19 | 1A | 1B | 1C | 1D | 1E | 1F | 0 | 1 | 2 | 3 | 4 | 5 | 6 | 7 | 8 | 9 | A | B | C | D | E | F |

FIG. 9

| Burst Length | ICA<K'> | ICA<K> | \multicolumn{32}{c}{Burst Cycle Number and Burst Address Sequence} |||||||||||||||||||||||||||||||
|---|---|---|---|---|---|---|---|---|---|---|---|---|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| 32 | 0 | 0 | 0 | 1 | 2 | 3 | 4 | 5 | 6 | 7 | 8 | 9 | A | B | C | D | E | F | 10 | 11 | 12 | 13 | 14 | 15 | 16 | 17 | 18 | 19 | 1A | 1B | 1C | 1D | 1E | 1F |
| | 0 | 1 | 8 | 9 | A | B | C | D | E | F | 0 | 1 | 2 | 3 | 4 | 5 | 6 | 7 | 18 | 19 | 1A | 1B | 1C | 1D | 1E | 1F | 10 | 11 | 12 | 13 | 14 | 15 | 16 | 17 |
| | 1 | 0 | 10 | 11 | 12 | 13 | 14 | 15 | 16 | 17 | 18 | 19 | 1A | 1B | 1C | 1D | 1E | 1F | 0 | 1 | 2 | 3 | 4 | 5 | 6 | 7 | 8 | 9 | A | B | C | D | E | F |
| | 1 | 1 | 18 | 19 | 1A | 1B | 1C | 1D | 1E | 1F | 10 | 11 | 12 | 13 | 14 | 15 | 16 | 17 | 8 | 9 | A | B | C | D | E | F | 0 | 1 | 2 | 3 | 4 | 5 | 6 | 7 |

SEMICONDUCTOR MEMORY DEVICE AND OPERATING METHOD THEREOF

CROSS-REFERENCE TO RELATED APPLICATIONS

This application is a division of U.S. patent application Ser. No. 16/253,023 filed on Jan. 21, 2019, which claims benefits of priority of Korean Patent Application No. 10-2018-0040203 filed on Apr. 6, 2018. The disclosure of each of the foregoing application is incorporated herein by reference in its entirety.

BACKGROUND

1. Field

Exemplary embodiments of the present invention relate generally to semiconductor memory devices, and more particularly, to a semiconductor memory device and an operating method thereof capable of more efficient and reliable reading of stored data.

2. Description of the Related Art

Semiconductor memory devices may employ a plurality of memory regions which may be grouped or organized in various ways. Generally, various techniques have been devised for improving the reading of data from the plurality of memory regions. However, constantly increasing demands for faster, more reliable, high capacity semiconductor memory devices, requires further improvements in the reading of data from the various memory regions employed by a semiconductor memory device. For example, it is highly desirable that read control signals corresponding to different memory regions of the semiconductor memory device may be inputted gapless, and also that the semiconductor memory device may output the read data gapless from the various memory regions.

SUMMARY

Various embodiments of the present invention are directed to a semiconductor memory device in which read burst sequence information for each bank group is normally reflected when read data are alternately outputted from different bank groups, and an operating method of the semiconductor memory device.

In accordance with an embodiment of the present invention, a semiconductor memory device includes: a memory region including a plurality of memory blocks, and suitable for outputting first and second read data from first and second memory blocks among the plurality of memory blocks based on first and second read control signals and a read address signal; a scheduler suitable for outputting a read scheduling signal based on the first and second read control signals; and an output driver suitable for outputting the first and second read data by a predetermined burst length alternately twice or more to a data pad based on a mode signal, wherein the first read data are outputted to the data pad according to a first burst sequence, and the second read data are outputted to the data pad according to a second burst sequence, based on the read scheduling signal.

In accordance with an embodiment of the present invention, an operating method of a semiconductor memory device includes: outputting a burst sequence information signal corresponding to a first memory block and a burst sequence information signal corresponding to a second memory block alternately twice as a read scheduling signal based on first and second read control signals; outputting first read data having a first burst length among first read data from the first memory block to a data pad based on the read scheduling signal for a first read period; outputting second read data having a second burst length among second read data from the second memory block to the data pad based on the read scheduling signal for a second read period; outputting first read data having a third burst length among the first read data from the first memory block to the data pad based on the read scheduling signal for a third read period; and outputting second read data having a fourth burst length among the second read data generated from the second memory block to the data pad based on the read scheduling signal for a fourth read period.

In accordance with an embodiment of the present invention, a semiconductor memory device includes: a memory region including a first memory block and a second memory block, suitable for outputting first read data from the first memory block and second read data from the second memory block, the first read data and the second read data have a first length; a scheduler suitable for receiving a first burst sequence for the first memory block and a second burst sequence for the second memory block, latching the first burst sequence and the second burst sequence, and alternatively generating the first burst sequence and the second burst sequence; and an output driver suitable for receiving the first read data and the second read data, and sequentially outputting a portion of the first read data, a portion of the second read data, a remaining portion of the first read data and a remaining portion of the second read data based on the alternatively generated first and second burst sequences, wherein the portion of the first read data, the portion of the second read data, the remaining portion of the first read data and the remaining portion of the second read data have a second length that is half of the first length.

These and other features and advantages of the present invention will become apparent to those skilled in the art of the invention from the following detailed description in conjunction with the following drawings.

DETAILED DESCRIPTION

Various embodiments of the present invention will be described below in more detail with reference to the accompanying drawings. These embodiments are provided so that the disclosure of the invention is thorough and complete. All "embodiments" referred to in this disclosure refer to embodiments of the inventive concept disclosed herein. However, it is noted that the embodiments presented are merely examples of the invention and are not intended to limit the scope of the invention which is defined in the appended claims. It will be understood that many other embodiments and variations thereof may be envisioned by those skilled in the art of the invention without departing from the scope of the claims.

Moreover, it is noted that the terminology used herein is for the purpose of describing the embodiments only and is not intended to be limiting of the invention. As used herein, singular forms are intended to include the plural forms as well, unless the context clearly indicates otherwise. It will be further understood that the terms "comprises," "comprising," "includes" and/or "including" are used in this specification interchangeably to indicate the presence of any stated features and to not preclude the presence or addition of one or more other non-stated features. As used herein, the term "and/or" indicates any and all combinations of one or more of the associated listed items. It is also noted that in this specification, "connected/coupled" refers to one component not only directly connected/coupled with another component but also indirectly connected/coupled another component through an intermediate component.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate various features of the described embodiments.

Figure 1:
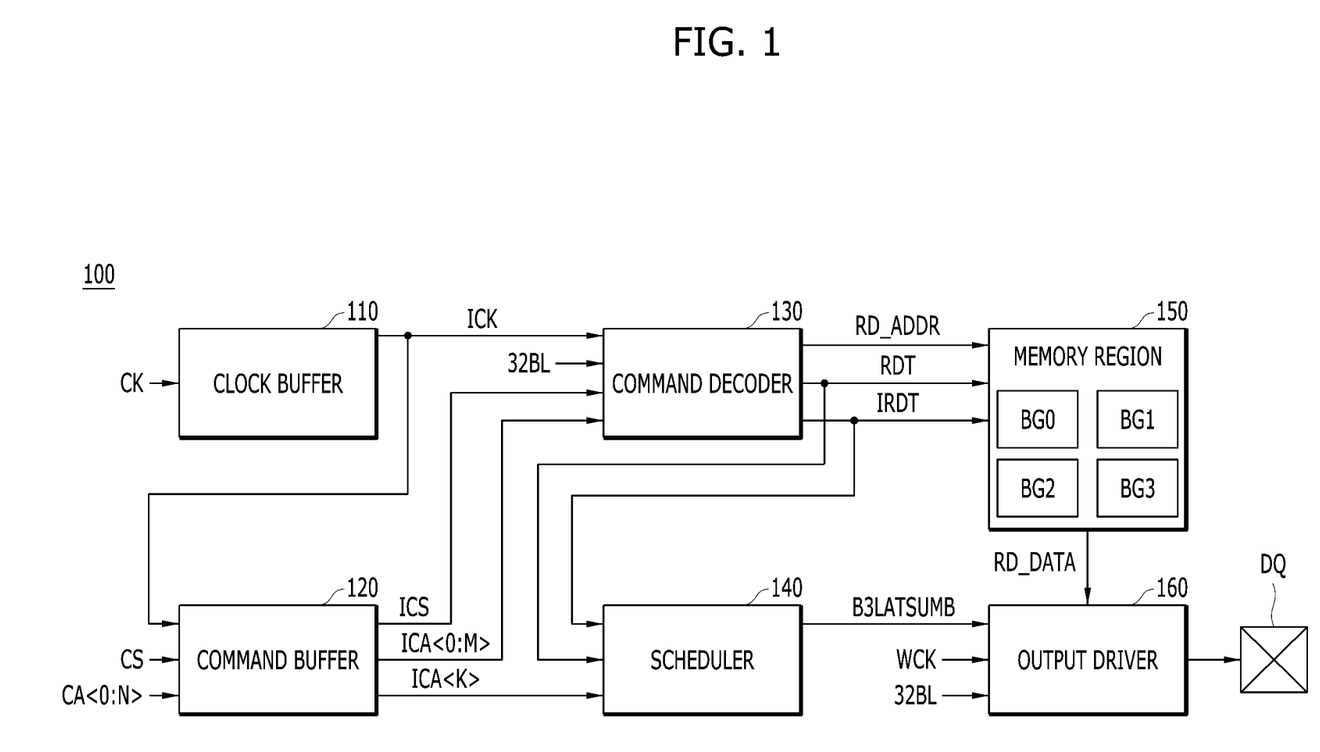
FIG. 1 is a block diagram illustrating a semiconductor memory device in accordance with an embodiment of the present invention.

FIG. 1 is a block diagram illustrating a semiconductor memory device 100 in accordance with an embodiment of the present invention.

Referring to FIG. 1, the semiconductor memory device 100 may include a clock buffer 110, a command buffer 120, a command decoder 130, a scheduler 140, a memory region 150, and an output driver 160.

The clock buffer 110 may generate an internal clock signal ICK based on a clock signal CK received from an external device (not shown). The external device may be a host device employing the semiconductor memory device 100. The external device may be any suitable electronic device.

The command buffer 120 may generate internal command signals ICS and ICA<0:M> based on command signals CS and CA<0:N> received form the external device. The internal command signals ICS and ICA<0:M> may include an address signal representing a read burst sequence. Hereinafter, the address signal representing a read burst sequence among the internal command signals ICS and ICA<0:M> is referred to as a "burst sequence information signal ICA<K>".

The command decoder 130 may generate a read address signal RD_ADDR and first and second read control signals RDT and IRDT based on the internal clock signal ICK, a mode signal 32BL and the internal command signals ICS and ICA<0:M>. Particularly, the command decoder 130 may activate the first read control signal RDT based on the mode signal 32BL and activate the second read control signal IRDT after a predetermined time passes. The predetermined time may include a minimum time tCCD_S, which is to be described below.

The mode signal 32BL may be set in advance in a mode register write circuit (not illustrated). The mode signal 32BL may represent one burst length operation among burst length operations that are supported in a bank group mode. For example, the mode signal 32BL may represent a burst length 32 operation among the burst length 32 operation and a burst length 16 operation that are supported in the bank group mode.

The scheduler 140 may output a read scheduling signal B3LATSUMB based on the first and second read control signals RDT and IRDT and the burst sequence information signal ICA<K>. For example, the scheduler 140 may output the burst sequence information signal ICA<K> inputted previously and the burst sequence information signal ICA<K> inputted thereafter twice alternately as the read scheduling signal B3LATSUMB.

The memory region 150 may include first to fourth memory blocks BG0 to BG3. Each of the first to fourth memory blocks BG0 to BG3 may include two or more banks. A bank may include a plurality of memory cells organized in rows and columns. Hereinafter, the first to fourth memory blocks BG0 to BG3 are referred to as "first to fourth bank groups".

The memory region 150 may output a read data RD_DATA based on the read address signal RD_ADDR and the first and second read control signals RDT and IRDT. For example, the memory region 150 may select any one of the first to fourth bank groups BG0 to BG3 based on the read address signal RD_ADDR, and output the 32-bit read data RD_DATA from the selected bank group based on the first and second read control signals RDT and IRDT. In other words, the memory region 150 may output 16-bit read data out of the 32-bit read data RD_DATA from the selected bank group based on the first read control signal RDT, and output remaining 16-bit read data output the 32-bit read data RD_DATA from the selected bank group based on the second read control signal IRDT. When the read address signal RD_ADDR is inputted twice consecutively, the bank group selected based on the read address signal RD_ADDR inputted previously is referred to as a "first bank group", and the bank group selected based on the read address signal RD_ADDR inputted thereafter is referred to as a "second bank group". The 32-bit read data RD_DATA outputted from the first bank group is referred to as "first bank read data", the 16-bit read data of the first read data is referred to as "first part of the first bank read data", the remaining 16-bit read data of the first read data is referred to as "second part of the first bank read data". The 32-bit read data RD_DATA generated from the second bank group is referred to as "second bank read data", the 16-bit read data of the second read data is referred to as "first part of the second bank read data", and the remaining 16-bit read data of the second read data is referred to as "second part of the second bank read data".

The output driver 160 may output the first part of the first bank read data, second part of the first bank read data, first part of the second bank read data and second part of the second bank read data alternately to a data pad DQ based on the read scheduling signal B3LATSUMB, the mode signal 32BL and a write clock signal WCK. For example, the output driver 160 may output any one of the first part of the first bank read data and the second part of the first bank read data as first output data to the data pad DQ according to a first burst sequence included in the burst sequence information signal ICA<K> inputted previously for a first read period. The output driver 160 outputs any one of the first part of the second bank read data and the second part of the second bank read data as second output data to the data pad DQ according to a second burst sequence included in the burst sequence information signal ICA<K> inputted thereafter for a second read period. The output driver 160 outputs remaining read data, which is not selected among the first part of the first bank read data and the second part of the first bank read data, as third output data to the data pad DQ according to the first burst sequence for a third read period. The output driver 160 outputs remaining read data, which is not selected among the first part of the second bank read data and the second part of the second bank read data, as fourth output data to the data pad DQ according to the second burst sequence for a fourth read period.

The first and second burst sequences may be the same or different. The first to fourth read periods may be continuous with each other gapless. Each of the first to fourth output data may have a burst length corresponding to 16 bits.

Figure 2:
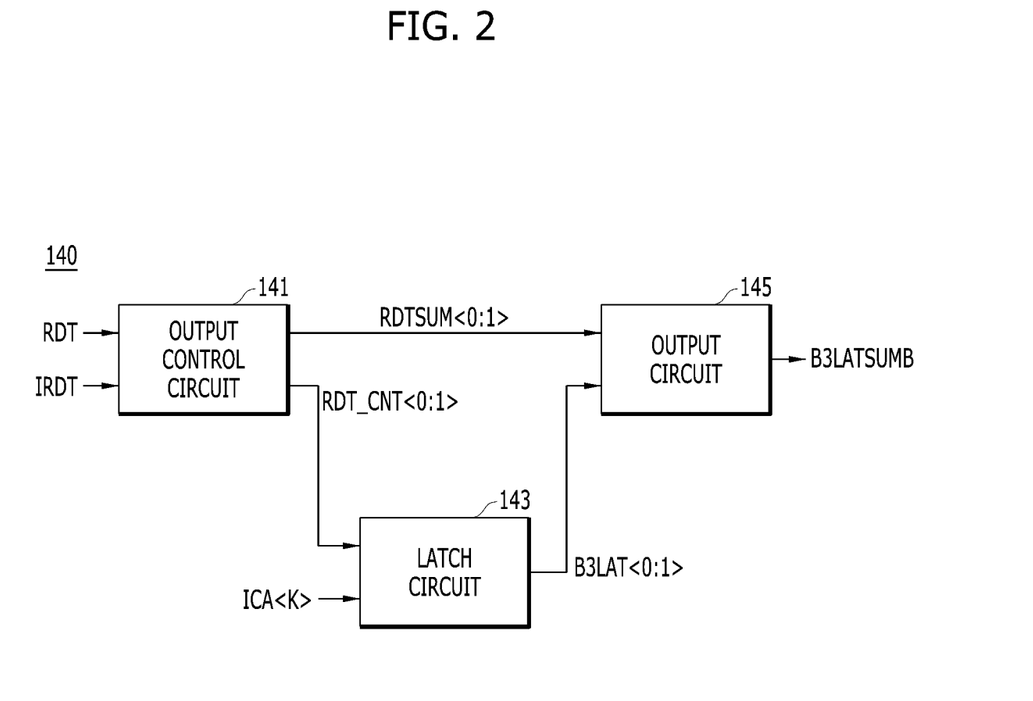
FIG. 2 is a block diagram illustrating a scheduler shown in FIG. 1.

FIG. 2 is a block diagram illustrating a scheduler in accordance with an embodiment of the present invention, for example, the scheduler 140 shown in FIG. 1.

Referring to FIG. 2, the scheduler 140 may include an output control circuit 141, a latch circuit 143, and an output circuit 145.

The output control circuit 141 may generate a first output control signal RDTSUM<0> activated twice corresponding to the internal command signals ICS and ICA<0:M> inputted previously and a second output control signal RDTSUM<1> activated twice corresponding to the internal command signals ICS and ICA<0:M> inputted thereafter based on the first and second read control signals RDT and IRDT.

The latch circuit 143 may sequentially latch the burst sequence information signal ICA<K> as first and second information signals B3LAT<0:1> according to an input sequence based on first and second read count signals RDT_CNT<0:1>. The first and second read count signals RDT_CNT<0:1> may be generated from the output control circuit 141, which will be described in detail below.

The output circuit 145 may alternately select the first and second information signals B3LAT<0:1> twice based on the first and second output control signal RDTSUM<0:1> and output the selected information signal as the read scheduling signal B3LATSUMB.

Figure 3:
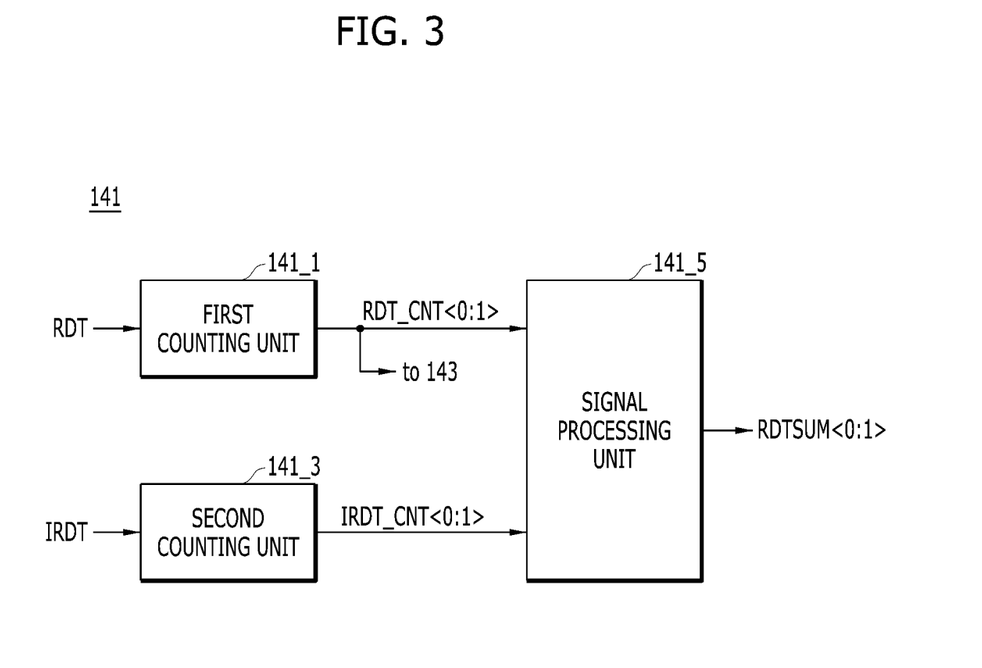
FIG. 3 is a block diagram illustrating an output control circuit shown in FIG. 2.

FIG. 3 is a block diagram illustrating an output control circuit in accordance with an embodiment of the present invention, for example, the output control circuit 141 shown in FIG. 2.

Referring to FIG. 3, the output control circuit 141 may include a first counting unit 141_1, a second counting unit 141_3, and a signal processing unit 141_5.

The first counting unit 141_1 may generate the first and second read count signals RDT_CNT<0:1> based on the first read control signal RDT. For example, the first counting unit 141_1 may activate the first read count signal RDT_CNT<0> when the first read control signal RDT is activated firstly and activate the second read count signal RDT_CNT<1> when the first read control signal RDT is activated secondly.

The second counting unit 141_3 may generate third and fourth read count signals IRDT_CNT<0:1> based on the second read control signal IRDT. For example, the second counting unit 141_3 may activate the third read count signal IRDT_CNT<0> when the second read control signal IRDT is activated firstly and activate the fourth read count signal IRDT_CNT<1> when the second read control signal IRDT is activated secondly.

The signal processing unit 141_5 may generate the first and second output control signals RDTSUM<0:1> based on the first to fourth read count signals RDT_CNT<0:1> and IRDT_CNT<0:1>. For example, the signal processing unit 141_5 may logically add (for example, perform an OR operation) the first and third read count signals RDT_CNT<0> and IRDT_CNT<0> to generate the first output control signal RDTSUM<0>, and may logically add (for example, perform the OR operation) the second and fourth read count signals RDT_CNT<1> and IRDT_CNT<1> to generate the second output control signal RDTSUM<1>.

Figure 4:
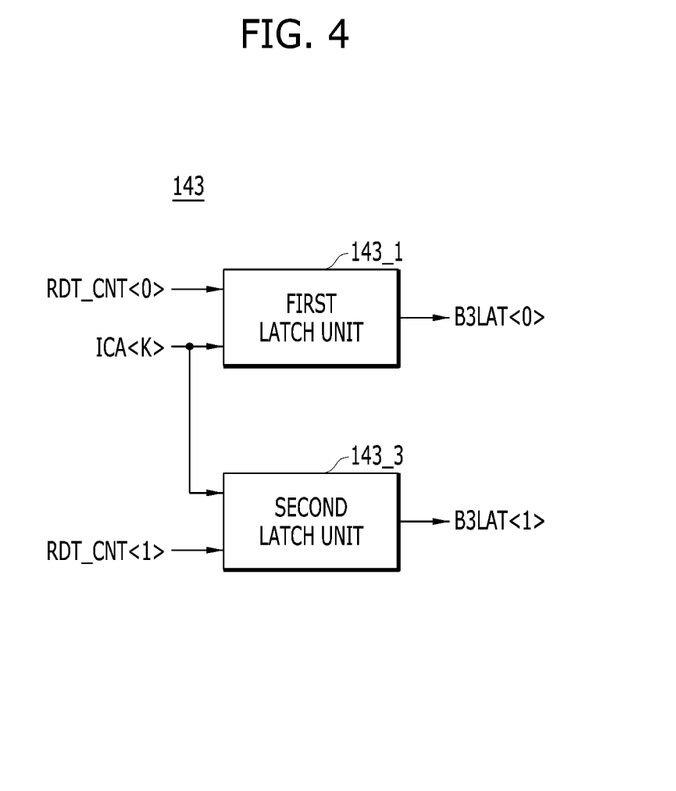
FIG. 4 is a block diagram illustrating a latch circuit shown in FIG. 2.

FIG. 4 is a block diagram illustrating a latch circuit in accordance with an embodiment of the present invention, for example, the latch circuit 143 shown in FIG. 2.

Referring to FIG. 4, the latch circuit 143 may include a first latch unit 143_1, and a second latch unit 143_3.

The first latch unit 143_1 may latch the burst sequence information signal ICA<K> inputted previously as the first information signal B3LAT<0> based on the first read count signal RDT_CNT<0>.

The second latch unit 143_3 may latch the burst sequence information signal ICA<K> inputted thereafter as the second information signal B3LAT<1> based on the second read count signal RDT_CNT<1>.

Figure 5:
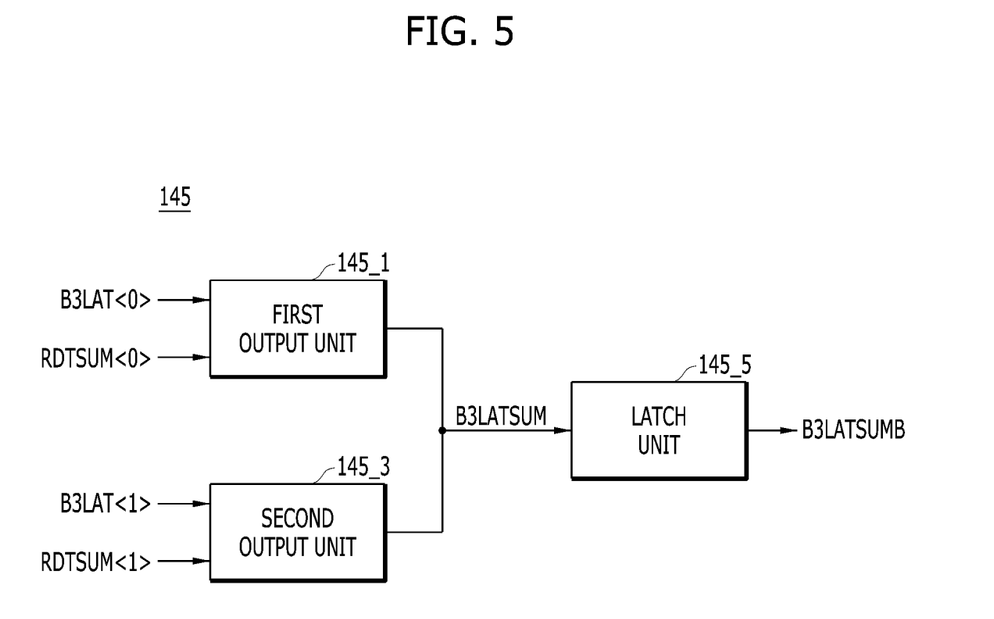
FIG. 5 is a block diagram illustrating an output circuit shown in FIG. 2.

FIG. 5 is a block diagram illustrating an output circuit in accordance with an embodiment of the present invention, for example, the output circuit 145 shown in FIG. 2.

Referring to FIG. 5, the output circuit 145 may include a first output unit 145_1, a second output unit 145_3, and a latch unit 145_5.

The first output unit 145_1 may output the first information signal B3LAT<0> as an output information signal B3LATSUM twice based on the first output control signal RDTSUM<0>.

The second output unit 145_3 may output the second information signals B3LAT<1> as the output information signal B3LATSUM twice based on the second output control signal RDTSUM<1>.

The latch unit 145_5 may latch the output information signal B3LATSUM to output as the read scheduling signal B3LATSUMB.

Hereafter, an operation of the semiconductor memory device 100 having the aforementioned structure is described with reference to FIG. 6.

Figure 6:
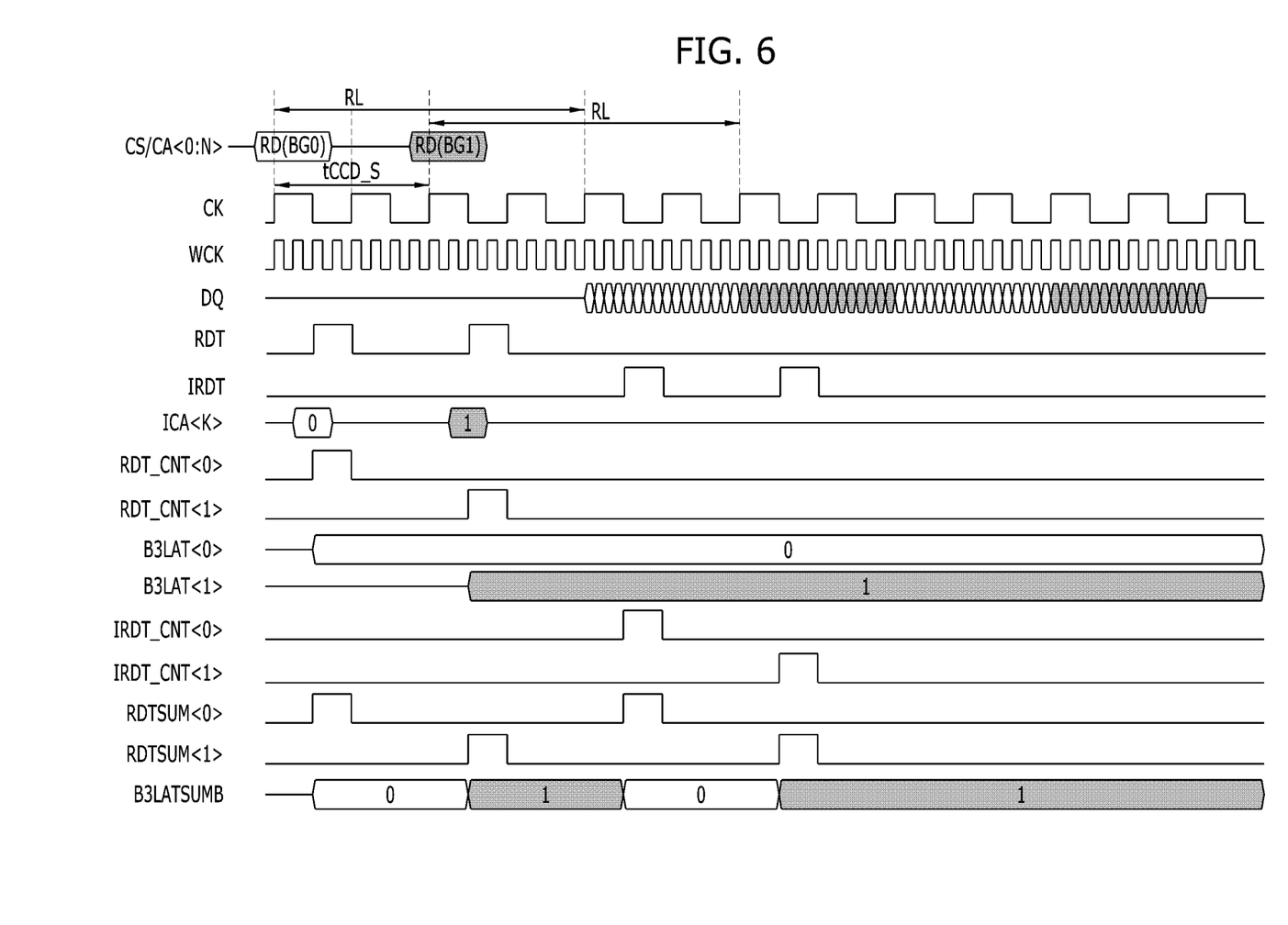
FIG. 6 is a timing diagram illustrating an operation of a semiconductor memory device shown in FIG. 1.

FIG. 6 is a timing diagram illustrating an operation of a semiconductor memory device in accordance with an embodiment of the present invention, for example, an operation of the semiconductor memory device 100 shown in FIG. 1.

Referring to FIG. 6, the clock buffer 110 of FIG. 1 may buffer the clock signal CK to generate the internal clock signal ICK. The command buffer 120 may buffer the command signals CS and CA<0:N> to generate the internal command signals ICS and ICA<0:M>. The internal command signals ICS and ICA<0:M> and the burst sequence information signal ICA<K> which correspond to the first bank group may be inputted, and subsequently the internal command signals ICS and ICA<0:M> and the burst sequence information signal ICA<K> which correspond to the second bank group may be inputted gapless. The fact that the signals are inputted gapless means that the signals are inputted at a minimum time tCCD_S interval to access different bank groups.

The command decoder 130 may generate the first read control signal RDT which is activated twice at the minimum time tCCD_S interval corresponding to the first and second bank groups based on the internal command signals ICS and ICA<0:M>. In addition, the command decoder 130 may generate the second read control signal IRDT obtained by delaying the first read control signal RDT by a predetermined time. The predetermined time may correspond to twice as much as the minimum time tCCD_S. The command decoder 130 may sequentially generate the read address signal RD_ADDR corresponding to each of the first and second bank groups.

The memory region 150 may output the first read data from the first bank group and second read data from the second bank group based on the read address signal RD_ADDR, the first read control signal RDT and the second read control signal IRDT.

The scheduler 140 may activate the first read count signal RDT_CNT<0> when the first read control signal RDT is activated firstly, activate the second read count signal RDT_CNT<1> when the first read control signal RDT is activated secondly. Further, the scheduler 140 may activate the third read count signal IRDT_CNT<0> when the second read control signal IRDT is activated firstly, and activate the fourth read count signal IRDT_CNT<1> when the second read control signal IRDT is activated secondly. Further, the scheduler 140 may logically add the first and third read count signals RDT_CNT<0> and IRDT_CNT<0> to generate the first output control signal RDTSUM<0> that is activated twice at a time interval corresponding to twice as much as the minimum time tCCD_S, and may logically add the second and fourth read count signals RDT_CNT<1> and IRDT_CNT<1> to generate the second output control signal RDTSUM<1> that is activated twice at the time interval corresponding to twice as much as the minimum time tCCD_S.

The scheduler 140 may alternately select the burst sequence information signal ICA<K> ("0") corresponding to the first bank group and the burst sequence information signal ICA<K> ("1") corresponding to the second bank group to output as the read scheduling signal B3LATSUMB based on the first and second output control signal RDTSUM<0:1>.

The output driver 160 may alternately output the first part of the first bank read data, the second part of the first bank read data, the first part of the second bank read data and the second part of the second bank read data having the same burst length to the data pad DQ based on the read scheduling signal B3LATSUMB, the mode signal 32BL and the write clock signal WCK.

In this case, the first part of the first bank read data and the second part of the first bank read data may be outputted to the data pad DQ according to the first burst sequence, and the first part of the second bank read data and the second part of the second bank read data may be outputted to the data pad DQ according to the second burst sequence. The first and second burst sequences may be the same or different.

Figure 7:
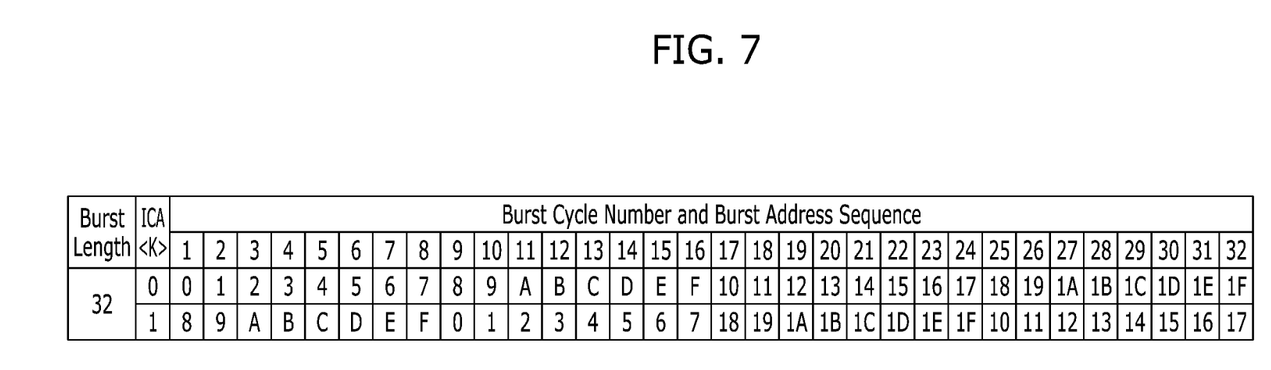
FIGS. 7 to 9 are tables for describing burst sequences according to embodiments.
Figure 8:
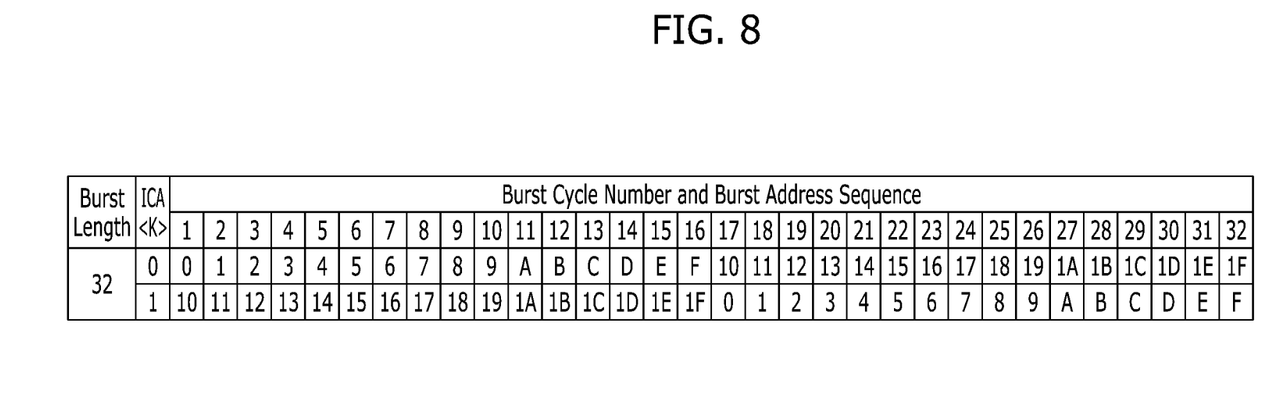

FIGS. 7 and 8 are tables for describing the first and second burst sequences according to embodiments.

As shown in FIG. 7, when the burst sequence information signal ICA<K> has a logic low level, i.e., '0', the 32-bit read data may be sequentially outputted according to a sequence defined by default values. When the burst sequence information signal ICA<K> has a logic high level, i.e., '1', the 32-bit read data may be sequentially outputted according to a sequence changed in units of 8 bits as compared with the default values.

As shown in FIG. 8, when the burst sequence information signal ICA<K> has a logic low level, i.e., '0', the 32-bit read data may be sequentially outputted according to a sequence defined by default values. When the burst sequence information signal ICA<K> has a logic high level, i.e., '1', the 32-bit read data may be sequentially outputted according to a sequence changed in units of 16 bits as compared with the default values.

Although it is described as an example that a single burst sequence information signal ICA<K> is used, the present invention is not limited to this, and two burst sequence information signals ICA<K> and ICA<K'> may be used. When the two burst sequence information signals ICA<K> and ICA<K'> are used, burst sequences corresponding to four cases may be applied.

Figure 9:
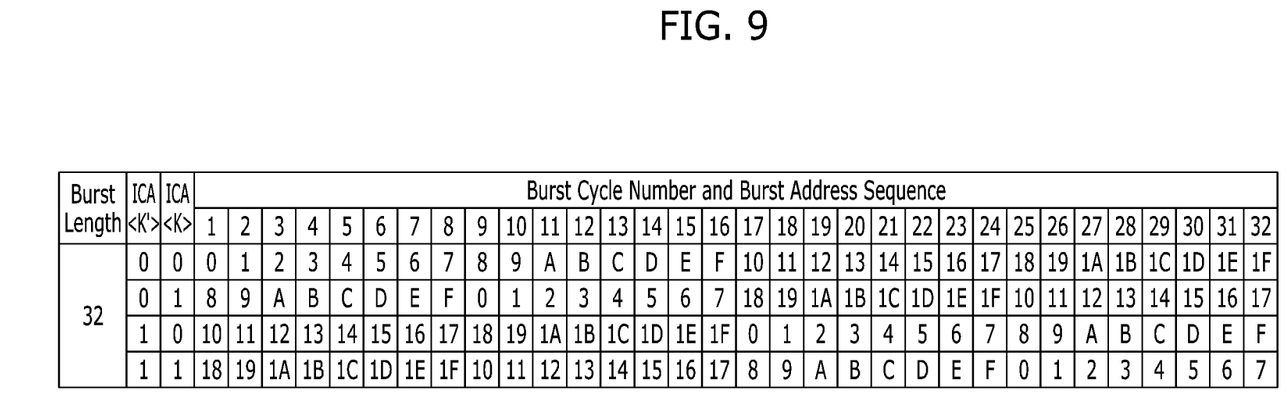

FIG. 9 is a table for describing first to fourth burst sequences corresponding to first and second burst sequence information signals ICA<K> and ICA<K'>.

As shown in FIG. 9, when the first and second burst sequence information signals ICA<K> and ICA<K'> have logic levels of '00', the 32-bit read data may be sequentially outputted according to a sequence defined by default values. When the first and second burst sequence information signals ICA<K> and ICA<K'> have logic levels of '01', the 32-bit read data may be sequentially outputted according to a sequence changed in units of 8 bits as compared with the default values. When the first and second burst sequence information signals ICA<K> and ICA<K'> have logic levels of '10', the 32-bit read data may be sequentially outputted according to a sequence changed in units of 16 bits as compared with the default values. When the first and second burst sequence information signals ICA<K> and ICA<K'> have logic levels of '11', the 32-bit read data may be sequentially outputted according to a sequence changed in units of 16 bits as compared that the first and second burst sequence information signals ICA<K> and ICA<K'> have logic levels of '01'.

To sum up, an operating method of the semiconductor memory device 100 may include outputting the burst sequence information signal ICA<K> corresponding to the first bank group and the burst sequence information signal ICA<K> corresponding to the second bank group alternately twice as the read scheduling signal B3LATSUMB based on the first and second read control signals RDT and IRDT, outputting the first part of the first bank read data generated from the first bank group to the data pad DQ based on the read scheduling signal B3LATSUMB for the first read period, outputting the first part of the second bank read data generated from the second bank group to the data pad DQ based on the read scheduling signal B3LATSUMB for the second read period, outputting the second part of the first bank read data generated from the first bank group to the data pad DQ based on the read scheduling signal B3LATSUMB for the third read period, and outputting the second part of the second bank read data generated from the second bank group to the data pad DQ based on the read scheduling signal B3LATSUMB for the fourth read period.

As is apparent from the above descriptions, in the semiconductor memory device and the operating method thereof, a read burst sequence information signal allocated to each of a plurality of bank groups may be accurately reflected when read data are alternately outputted from different bank groups.

As the read burst sequence information signal is normally reflected when the read data are alternately outputted from different memory blocks each including bank groups, operational reliability of the semiconductor memory device may be improved.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the spirit and/or scope of the present invention as defined by the following claims.

What is claimed is:

1. An operating method of a semiconductor memory device, comprising:
outputting a burst sequence information signal corresponding to a first memory block and a burst sequence information signal corresponding to a second memory block alternately twice as a read scheduling signal based on first and second read control signals;
outputting first read data having a first burst length among first read data from the first memory block to a data pad based on the read scheduling signal for a first read period;
outputting second read data having a second burst length among second read data from the second memory block to the data pad based on the read scheduling signal for a second read period;
outputting first read data having a third burst length among the first read data from the first memory block to the data pad based on the read scheduling signal for a third read period; and
outputting second read data having a fourth burst length among the second read data generated from the second memory block to the data pad based on the read scheduling signal for a fourth read period,
wherein the outputting of the burst sequence information signal as the read scheduling signal includes:
generating a first output control signal which is activated twice and a second output control signal which is activated twice at a predetermined time interval with the first output control signal based on the first and second read control signals;
sequentially latching the burst sequence information signal as first and second information signals according to an input sequence based on first and second read count signals; and
selecting the first and second information signals alternately twice and outputting the selected information signal as the read scheduling signal based on the first and second output control signals.

2. The operating method of claim 1, wherein the first read data are outputted to the data pad according to a first burst sequence, and the second read data are outputted to the data pad according to a second burst sequence which is equal to or different from the first burst sequence.

3. The operating method of claim 1, wherein the first to fourth burst lengths are the same as each other.

4. The operating method of claim 1, wherein the first to fourth read periods are continuous with each other gapless.

* * * * *